3 Sheets--Sheet 1.
E. FOOTE & M. P. SMITH.
Improvement in Driers.
No. 124,944. Patented March 26, 1872.
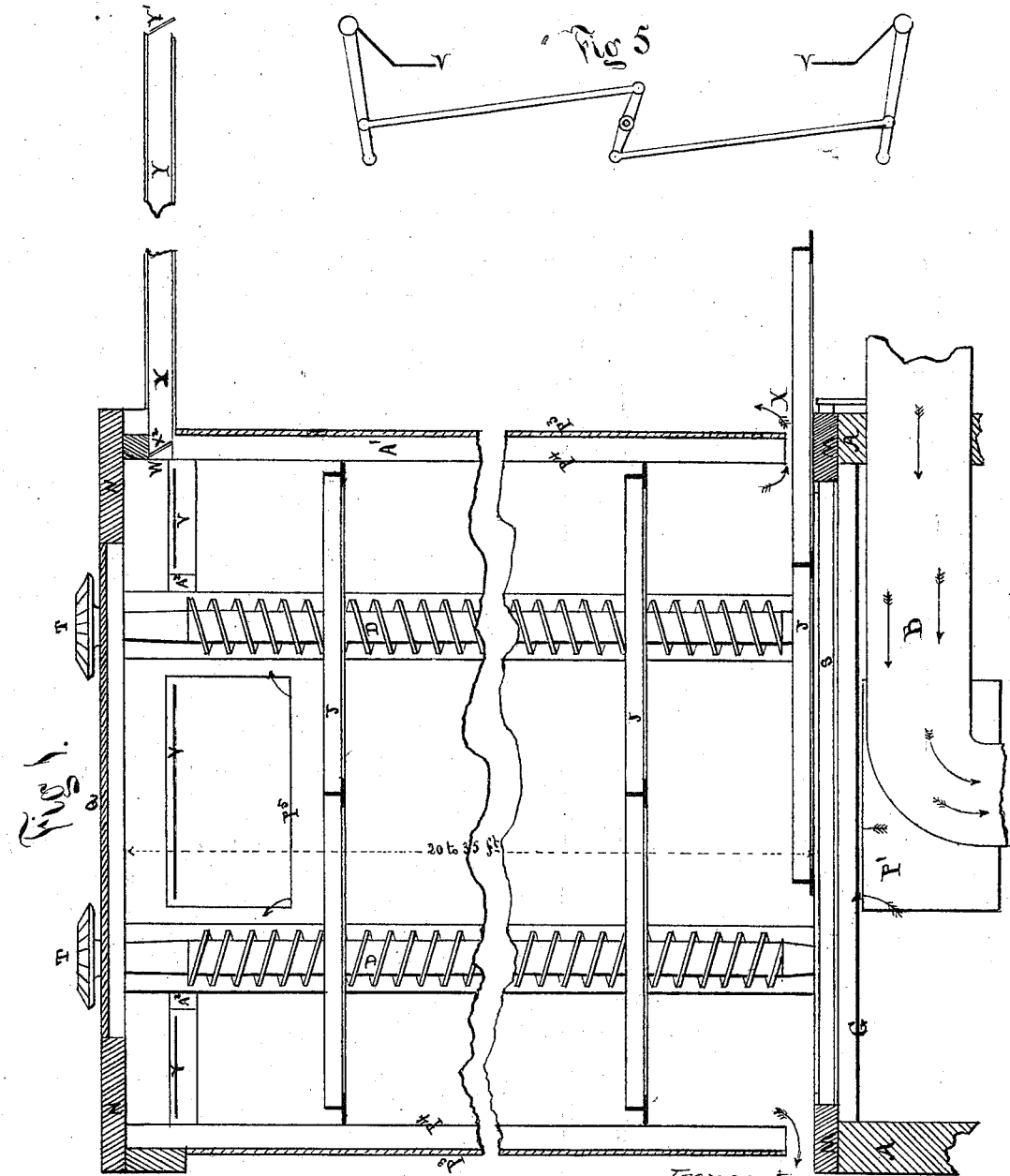
Witnesses
Jas. W. Kirkman
J. W. Woodford
Inventors
Elisha Foote
Marshall P. Smith

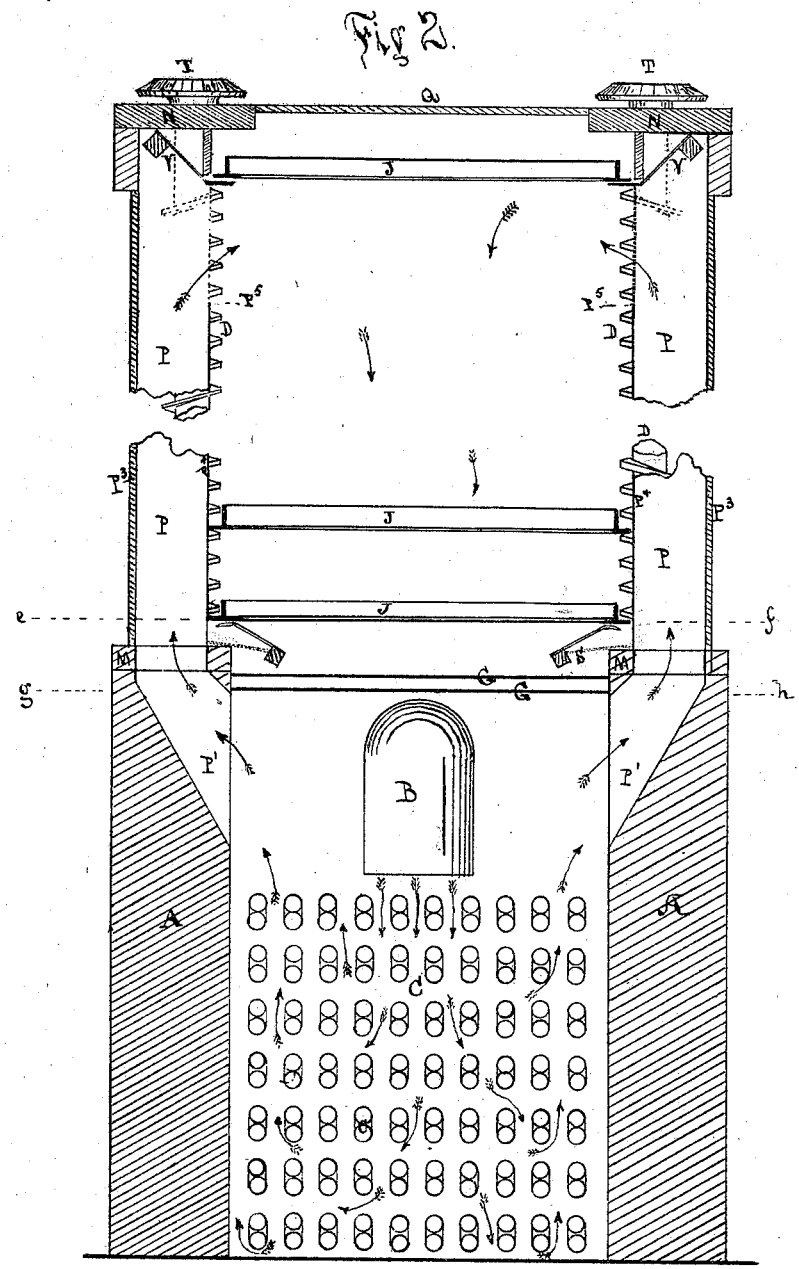

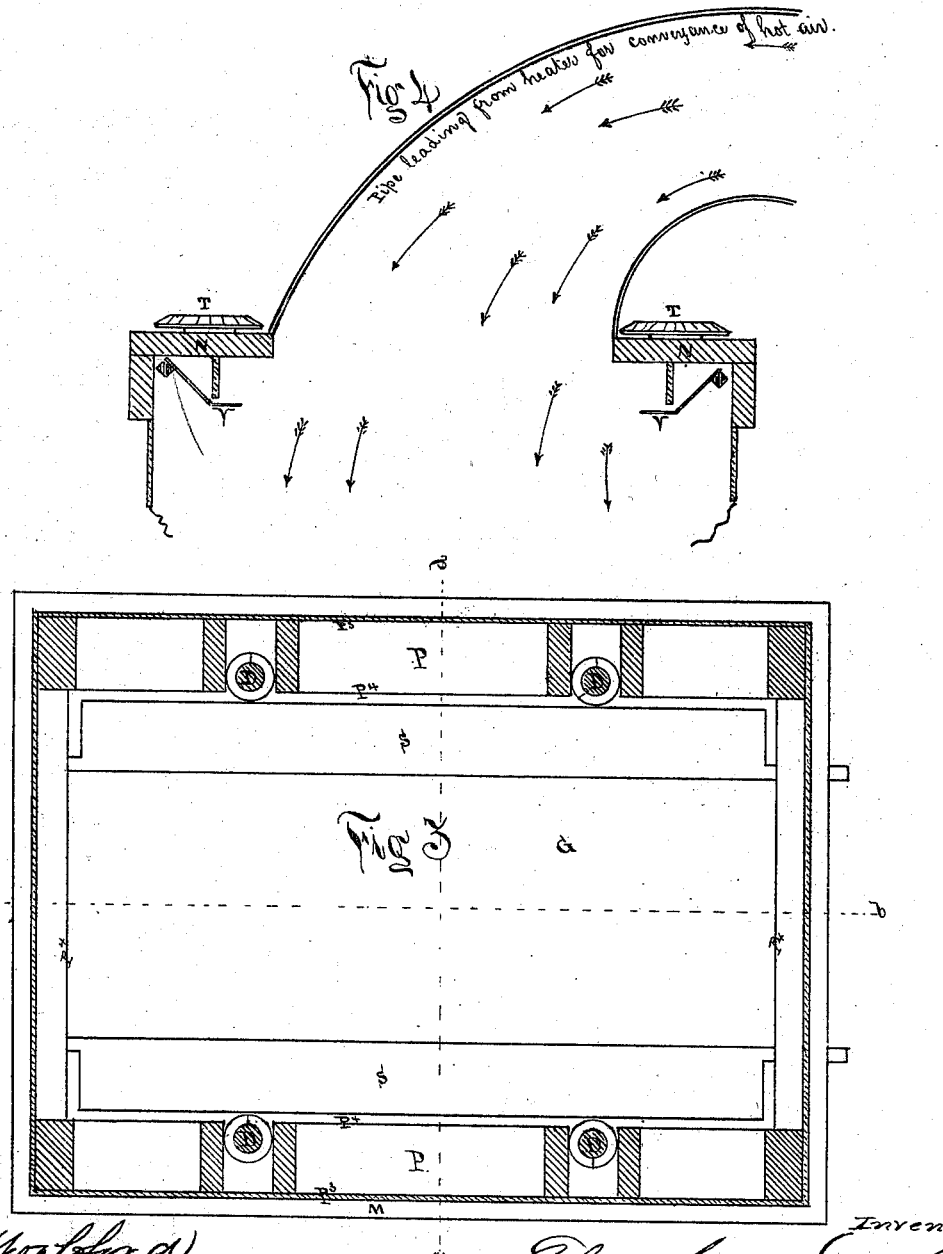

124,944

UNITED STATES PATENT OFFICE.

ELISHA FOOTE, OF EAST BLOOMFIELD, NEW YORK, AND MARSHALL P. SMITH, OF BALTIMORE, MARYLAND.

IMPROVEMENT IN DRIERS.

Specification forming part of Letters Patent No. 124,944, dated March 26, 1872.

We, ELISHA FOOTE, of East Bloomfield, in the county of Ontario and State of New York, and MARSHALL P. SMITH, of the city of Baltimore and State of Maryland, have invented certain Improvements in those Drying-Machines in which the articles to be dried are subjected to a current of air artificially heated, of which the following is a specification:

This invention relates to a new mode of supplying the heated air; and consists in introducing a blast of hot air into the upper portion of the chamber, causing it to traverse the same and descend through or around the platforms containing the drying-substances, and finally to escape at the lower portion of the chamber.

Although applicable to other descriptions of drying-machines, this improvement is especially useful in that class which consists of a series of platforms rising or falling in a vertical chamber. When such machines are constructed so that the air enters from below, and, rising, escapes from the top, if it be desired to cause the air to pass through the meshes or perforations of the platforms in succession, and thereby, in combination with a falling motion of the platforms, secure the advantages of an increasing heat and dryness, or, in combination with a rising motion of the platforms, effect a gradually-decreasing heat, it will be necessary to make the platforms to fit the chamber closely; for if a space be left in the sides through which the air may pass, it will naturally seek the more unobstructed channel of escape, and all gradually increasing or decreasing heat processes be frustrated; and, further, if heated air be permitted to escape before it has absorbed a considerable quantity of moisture, (and this will be the result if the air is not retained a sufficient time in contact with the fruit,) a very great waste of heat and power will be sustained. When such close-fitting platforms are employed, the fruit or vegetables must be so distributed as to allow spaces or interstices between the pieces to facilitate the upward passage of the air; or else a blast of sufficient power to force its way through the layers of fruit must be employed.

To correct these evils is the main object of this invention, and is accomplished, as before stated, by reversing the usual process, introducing the heated air at or near the top of the chamber, causing it to descend and traverse the same, and finally escape from the lower portion thereof. By this means the hot dry air collects around the upper platforms, distributes itself over the surfaces of the fruit or vegetables, and descends only so fast as it is forced down by the volume of fresh air which is furnished by the blower or fan. It is therefore held for a longer time in contact with the drying-substance, and far more thoroughly saturated with moisture than is practicable by the usual methods; and, further, by this plan it is not necessary that the platforms should fit the chamber closely, for, as no means of escape from above are provided, the air will descend through the chamber in strata of uniform but gradually decreasing temperature, through which the rising or falling platforms will pass.

In the drawing hereunto annexed is shown the method of applying this invention to the vertical screw-drying tower of Marshall P. Smith, patented September 13, 1870.

Figure 1 is a vertical longitudinal section through line $a\ b$. Fig. 2 is a vertical cross-section through line $c\ d$, showing the flues P and $P^1$. Fig. 3 is a horizontal transverse section through line $e\ f$. Fig. 4 shows the upper portion of the chamber and the mode of introducing hot air through pipes into the top. Fig. 5 shows the arrangement for coupling the flanges V V and S S.

A is a rectangular brick chamber, forming a foundation for the framing and machinery of the drying-chamber above, and containing the heating apparatus, which may be of any of the kinds in ordinary use; but the drawing shows an arrangement for heating the air, devised by Marshall P. Smith, and for which he has applied for Letters Patent. It will be found most convenient to locate this chamber in the cellar of the building, so that the manipulation of the fruit may be on the ground floor. The side walls of this chamber should be about twenty inches thick to allow space for the flues $P^1$ and afford a firm foundation for the screws. The end walls can be nine inches thick. This chamber is tightly covered with one or two sheets of boiler or cast iron, G, and from the upper part of the side walls proceed two flues, $P^1$, which communicate with two vertical flues, P P, situated on the sides of the chamber between the screws. $A^2 A^2$ are 3x12 inch joists, forming part of the framing of the vertical tower. $P^3$ is the outside casing of the tower, and $P^4$ the zinc or iron lining of the interior. This mode of construction provides a smooth polished surface for the interior of the tower, makes a strong and substantial structure, and furnishes a space or flue, P, for the conveyance of heated air, at once simple, economical, and effectual. M is a plating of timber resting upon the brick foundation, upon which the sockets of the screws are bolted, and into which the upper framing is mortised. The zinc lining over this flue P is carried only to the point $P^5$, leaving an opening through which the heated air enters the chamber. N is a heavy timber framing, which supports the upper ends of the screws. T T are bevel-gears, which engage with other bevel-gears, and which impart simultaneous motion to the screws D D. Q is the cover of the drying-tower, which fits closely; and J J are platforms or trays, resting in the threads of the vertical screws. W is the upper opening, and X the lower opening, through which the platforms are entered or discharged. Through the lower opening, or by others similarly situated, the saturated air escapes from the chamber. The upper opening W is provided with a close-fitting door, $X^2$, which drops down behind the trays as they are withdrawn, and the covered channel Y may be used to receive the tray until the door $X^2$ is closed, and prevent the escape of heat.

To operate this machine on the principle of a gradually-increasing heat and dryness, the flanges S S are dropped until their outer edges rest upon the timber M. The platform is then entered, raised by the flanges S S, which press it against the lower end of the thread of the revolving screw, as shown in the drawing, until it is engaged. The flanges are then dropped ready to receive other trays, which follow each other at regular intervals. The trays are slowly raised by the screws, encountering the descending current of air as they progress, until they arrive at the upper end of the thread of the screw. They are then lifted by the flanges V V, as shown in the drawing, and removed from the chamber. These upper flanges V V, as well as the lower flanges S S, are moved by levers coupled together, as shown in Fig. 5. Should, for any purpose, it be desired to reverse this process and dry the fruit or vegetable by a gradually-decreasing temperature, the trays will be entered at the top and withdrawn at the bottom.

The preceding specification describes the method of applying this improvement to the vertical-screw drier as generally constructed; but in some cases it may be desirable to dispense with the brick-foundation chamber, and to place the heater on the top of the drying-chamber. In this case the side flues P would not be used, and the base-timber M would be made heavier, so as to support the superstructure, and a frame chamber should be placed on or near the top to contain the heater. This chamber should also be lined with sheet-zinc, and cased outside to prevent loss by radiation. The cover Q should be removed, or an opening made there, to allow the hot air to enter. There are difficulties of construction in this arrangement which counterbalance the advantages gained, and we prefer in such cases to heat the air in a separate adjoining chamber near the top, and convey it into the drying-chamber by pipes, as shown in Fig. 4.

As before stated, it is not necessary that the platforms should fit the chamber closely, nor that they should be moved by screw mechanism; and we reserve to ourselves the right to apply the process of a descending column of heated air to all other descriptions of drying-machines, whether for fruit, vegetables, grain, wool, or any other purpose.

Having now described our invention, what we claim as new, and desire to secure by Letters Patent, is—

1. The mode of supplying air to drying-machines by introducing it at or near the top or upper portion of the drying-chamber, causing it to descend through or around the platforms or trays containing the drying-substances, and finally to escape from the lower portion of the chamber, in the manner and for the purposes substantially as described.

2. The process of drying animal and vegetable substances by placing the same on rising or falling platforms and exposing the same to a descending current of heated air, substantially as described.

3. The flues P P, and flanges S S and V V, when used in combination with a descending current in the drying-chamber, substantially as described.

ELISHA FOOTE.
MARSHALL P. SMITH.

Witnesses:
W. W. WOOLFORD,
JAS. W. KIRKMAN.